United States Patent
Yee et al.

(10) Patent No.: US 9,832,339 B1
(45) Date of Patent: Nov. 28, 2017

(54) IMAGE FORMING SYSTEM, IMAGE FORMING METHOD AND INFORMATION PROCESSING APPARATUS

(71) Applicant: KYOCERA Document Solutions Inc., Osaka-shi, Osaka (JP)

(72) Inventors: Mark Jefferson Yee, Cebu (PH); Ted Steven Tan, Osaka (JP); Mary Antonette Arnejo, Cebu (PH)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/250,702

(22) Filed: Aug. 29, 2016

(30) Foreign Application Priority Data

Aug. 10, 2016 (JP) .................................. 2016-157191

(51) Int. Cl.
| | | |
|---|---|---|
| *H04N 1/32* | (2006.01) | |
| *G06F 3/12* | (2006.01) | |
| *G06K 15/02* | (2006.01) | |

(52) U.S. Cl.
CPC ..... *H04N 1/32545* (2013.01); *H04N 1/32523* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2002/0051199 A1* | 5/2002 | Hatayama | ............... | G06K 15/00 358/1.15 |
| 2002/0163665 A1* | 11/2002 | Iwata | ................. | G06K 15/1857 358/1.15 |
| 2003/0011812 A1* | 1/2003 | Sesek | .................... | G06F 3/1204 358/1.15 |
| 2005/0214017 A1* | 9/2005 | Isobe | .................... | B41J 13/106 399/82 |
| 2006/0250638 A1* | 11/2006 | Wang | ................. | H04N 1/00236 358/1.15 |
| 2006/0268304 A1* | 11/2006 | Tanaka | .................. | G06F 3/1204 358/1.13 |
| 2012/0120438 A1* | 5/2012 | Sato | ....................... | G06F 3/1204 358/1.15 |
| 2014/0063542 A1* | 3/2014 | Aoki | ..................... | G06F 3/1296 358/1.15 |

FOREIGN PATENT DOCUMENTS

JP          2004178362 A          6/2004

\* cited by examiner

*Primary Examiner* — Beniyam Menberu
(74) *Attorney, Agent, or Firm* — Alleman Hall Creasman & Tuttle LLP

(57) ABSTRACT

An image forming system includes a plurality of image forming apparatuses, a print request receiving portion, a dividing portion, and a print job transmitting portion. The print request receiving portion receives a print request for a print object. The dividing portion, when a total number of pages to be printed is equal to or greater than a preset smallest number of pages, divides the print object into a plurality of page groups. The print job transmitting portion generates a plurality of divided print jobs that respectively correspond to the plurality of page groups divided by the dividing portion, and transmits the plurality of divided print jobs to the plurality of image forming apparatuses, respectively.

13 Claims, 9 Drawing Sheets

FIG.5

APPARATUS-TO-BE-USED SELECTION

| | ID INFO | LOCATION INFO |
|---|---|---|
| ☑ | 2A | ROOM A |
| ☑ | 2B | ROOM B |
| ☑ | 2C | ROOM A |
| ☐ | 2D | ROOM C |
| ☐ | 2E | ROOM C |
| ☑ | 2F | ROOM A |

RETURN | NEXT

FIG.6

DISCHARGE TRAY SELECTION

| ID INFO | DISCHARGE TRAY |
|---|---|
| 2A | SECOND DISCHARGE TRAY ▼ |
| 2B | THIRD DISCHARGE TRAY ▼ |
| 2C | SECOND DISCHARGE TRAY ▼ |
| 2F | THIRD DISCHARGE TRAY ▼ |

RETURN | NEXT

FIG.7

ALLOCATION ORDER SETTING

| ID INFO | ALLOCATION ORDER | |
|---|---|---|
| 2A | 4 | ▼ |
| 2B | 3 | ▼ |
| 2C | 1 | ▼ |
| 2F | 2 | ▼ |

RETURN    OK

FIG.8

PRINT REQUEST

NUMBER OF PAGES OF A COPY: 100

NUMBER OF COPIES TO BE PRINTED:  8

CANCEL    PRINT

FIG.9

| ID INFO | DIVIDED PRINT JOBS | |
|---|---|---|
| 2A | PAGES 1-100, 2 COPIES | 80A |
| 2B | PAGES 1-100, 2 COPIES | 80B |
| 2C | PAGES 1-100, 2 COPIES, ALLOCATION INFO | 80C |
| 2F | PAGES 1-100, 2 COPIES | 80F |

FIG.10

ALLOCATION INFO 81

| ID INFO | PAGE NUMBER | NUMBER OF COPIES |
|---|---|---|
| 2A | PAGES 1-100 | 2 COPIES |
| 2B | PAGES 1-100 | 2 COPIES |
| 2C | PAGES 1-100 | 2 COPIES |
| 2F | PAGES 1-100 | 2 COPIES |

FIG.11

| ID INFO | DIVIDED PRINT JOBS | |
|---|---|---|
| 2A | PAGES 76-100, 8 COPIES | 80A |
| 2B | PAGES 51-75, 8 COPIES | 80B |
| 2C | PAGES 1-25, 8 COPIES, ALLOCATION INFO | 80C |
| 2F | PAGES 26-50, 8 COPIES | 80F |

FIG.12

ALLOCATION INFO — 81

| ID INFO | PAGE NUMBER | NUMBER OF COPIES |
|---|---|---|
| 2C | PAGES 1-25 | 8 COPIES |
| 2F | PAGES 26-50 | 8 COPIES |
| 2B | PAGES 51-75 | 8 COPIES |
| 2A | PAGES 76-100 | 8 COPIES |

FIG.14

| OUTPUT RESULT | | |
|---|---|---|
| ID INFO | PAGE NUMBER | NUMBER OF COPIES |
| 2C | PAGES 1-25 | 8 COPIES |
| 2F | PAGES 26-50 | 8 COPIES |
| 2F | PAGES 51-75 | 8 COPIES |
| 2B | ERROR | ERROR |
| 2A | PAGES 76-100 | 8 COPIES |

90

IMAGE FORMING SYSTEM, IMAGE FORMING METHOD AND INFORMATION PROCESSING APPARATUS

INCORPORATION BY REFERENCE

This application is based upon and claims the benefit of priority from the corresponding Japanese Patent Application No. 2016-157191 filed on Aug. 10, 2016, the entire contents of which are incorporated herein by reference.

BACKGROUND

The present disclosure relates to: an image forming system for performing an image forming process by using a plurality of image forming apparatuses; an image forming method; and an information processing apparatus.

It takes a long time for a single image forming apparatus to print a lot of pages. There is known a system for performing a distributed printing in which a plurality of image forming apparatuses are used to print, and thereby reduces the printing time.

SUMMARY

An image forming system according to an aspect of the present disclosure includes a plurality of image forming apparatuses, a print request receiving portion, a dividing portion, and a print job transmitting portion. The print request receiving portion receives a print request for a print object. The dividing portion, when a total number of pages to be printed is equal to or greater than a preset smallest number of pages, divides the print object into a plurality of page groups. The print job transmitting portion generates a plurality of divided print jobs that respectively correspond to the plurality of page groups divided by the dividing portion, and transmits the plurality of divided print jobs to the plurality of image forming apparatuses, respectively.

An image forming method according to another aspect of the present disclosure includes a print request receiving step, a dividing step, and a print job transmitting step. In the print request receiving step, a print request for a print object is received. In the dividing step, when a total number of pages to be printed is equal to or greater than a preset smallest number of pages, the print object is divided into a plurality of page groups. In the print job transmitting step, a plurality of divided print jobs that respectively correspond to the plurality of page groups divided in the dividing step are generated, and the plurality of divided print jobs are transmitted to the plurality of image forming apparatuses, respectively.

An information processing apparatus according to a further aspect of the present disclosure includes a communication portion, a print request receiving portion, a dividing portion, and a print job transmitting portion. The communication portion performs communications with a plurality of image forming apparatuses. The print request receiving portion receives a print request for a print object. The dividing portion, when a total number of pages to be printed is equal to or greater than a preset smallest number of pages, divides the print object into a plurality of page groups. The print job transmitting portion generates a plurality of divided print jobs that respectively correspond to the plurality of page groups divided by the dividing portion, and transmits the plurality of divided print jobs to the plurality of image forming apparatuses, respectively.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a diagram showing an example of an apparatus-to-be-used selection screen which is used in the image forming system according to an embodiment of the present disclosure.

FIG. 6 is a diagram showing an example of a discharge tray selection screen which is used in the image forming system according to an embodiment of the present disclosure.

FIG. 7 is a diagram showing an example of an allocation order setting screen which is used in the image forming system according to an embodiment of the present disclosure.

FIG. 8 is a diagram showing an example of a print request screen which is used in the image forming system according to an embodiment of the present disclosure.

FIG. 9 is a diagram showing an example of divided print jobs which are used in the image forming system according to an embodiment of the present disclosure.

FIG. 10 is a diagram showing an example of allocation information which is used in the image forming system according to an embodiment of the present disclosure.

FIG. 11 is a diagram showing an example of the divided print jobs which are generated in the image forming system according to an embodiment of the present disclosure.

FIG. 12 is a diagram showing an example of the allocation information which is generated in the image forming system according to an embodiment of the present disclosure.

FIG. 14 is a diagram showing an example of an output result screen which is used in the image forming system according to an embodiment of the present disclosure.

DETAILED DESCRIPTION

The following describes an embodiment of the present disclosure with reference to the attached drawings. It should be noted that the following embodiment is an example of a specific embodiment of the present disclosure and should not limit the technical scope of the present disclosure.

Figure 1:
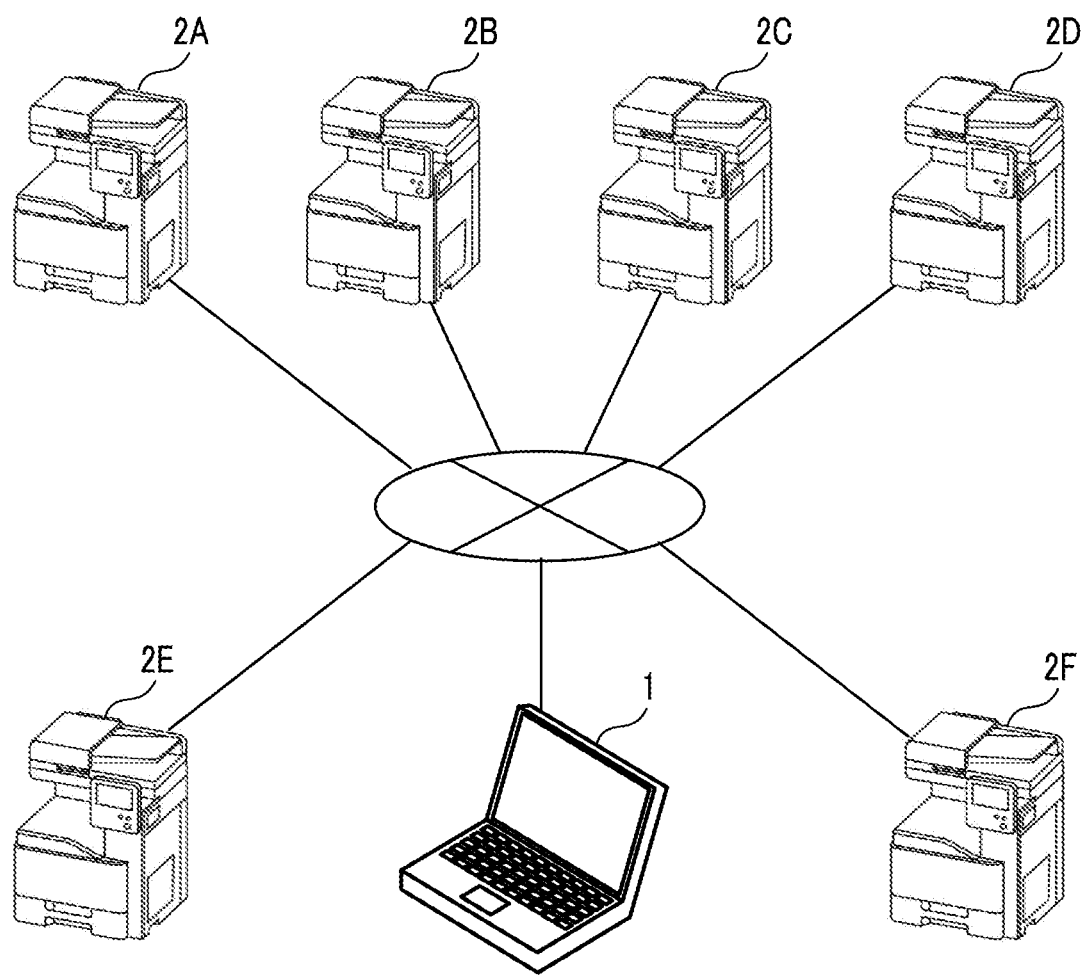
FIG. 1 is a diagram showing the configuration of an image forming system according to an embodiment of the present disclosure.

As shown in FIG. 1, an image forming system according to an embodiment of the present disclosure includes a print host apparatus 1 (an example of the information processing apparatus of the present disclosure) and a plurality of image forming apparatuses 2 (specifically, image forming apparatuses 2A-2F).

Figure 2:
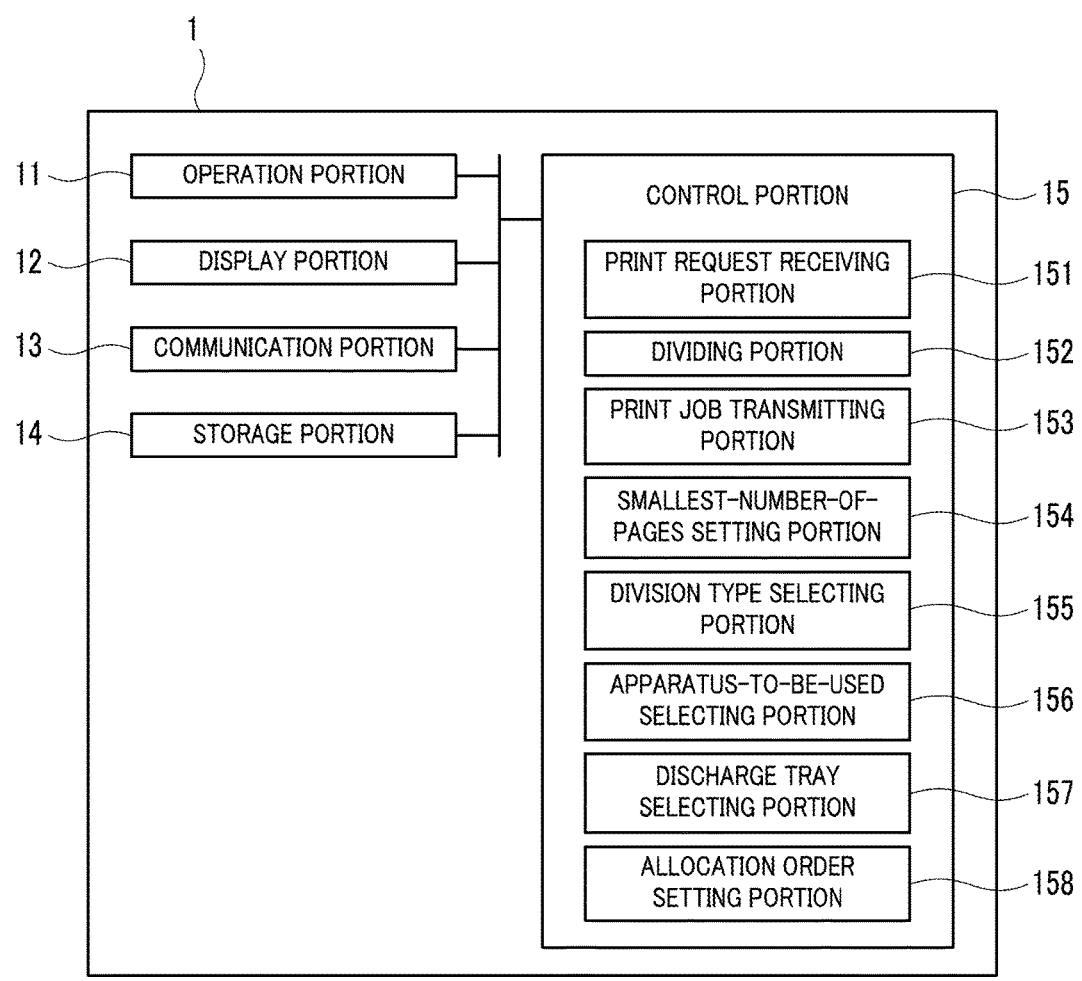
FIG. 2 is a block diagram showing the configuration of an image processing apparatus included in the image forming system according to an embodiment of the present disclosure.

As shown in FIG. 2, the print host apparatus 1 includes an operation portion 11, a display portion 12, a communication portion 13, a storage portion 14, and a control portion 15. The print host apparatus 1 is, for example, an information processing apparatus having a communication function, such as a notebook personal computer, a desktop personal computer, or a smartphone.

The operation portion 11 includes a keyboard, a mouse, a touchpad, or a touchpanel that inputs various information and instructions such as a print request in response to user operations.

The display portion 12 is a display portion, such as a crystal liquid display, for displaying information.

The communication portion 13 is a communication interface that can perform wired or wireless data communication with external communication apparatuses. By way of example, the communication portion 13 performs a communication with the image forming apparatuses 2 via a communication cable or a communication network such as a LAN.

The storage portion 14 is a nonvolatile storage portion such as a hard disk. The storage portion 14 stores image data and various control programs to be executed by the control portion 15. The control programs to be executed by the control portion 15 include a printer driver for controlling the image forming apparatuses 2 via the communication portion 13.

The control portion 15 includes control equipment such as CPU, ROM, and RAM. The CPU is a processor that executes various calculation processes. The ROM is a nonvolatile storage portion in which various information such as control programs for causing the CPU to execute various processes are stored in advance. The RAM is a volatile or nonvolatile storage portion that is used as a temporary storage memory (working area) for the various processes executed by the CPU.

Specifically, the control portion 15 includes a print request receiving portion 151, a dividing portion 152, a print job transmitting portion 153, a smallest-number-of-pages setting portion 154, a division type selecting portion 155, an apparatus-to-be-used selecting portion 156, a discharge tray selecting portion 157, and an allocation order setting portion 158. It is noted that the control portion 15 functions as these processing portions by executing processes in accordance with the printer driver. In addition, the control portion 15 may include an electronic circuit that realizes part or all of processing functions of the processing portions.

The print request receiving portion 151 receives a print request for a print object via a user operation performed on the operation portion 11 (see FIG. 8). The print object is, for example, document data.

The dividing portion 152, when the total number of pages to be printed is equal to or greater than a preset smallest number of pages, divides the print object into a plurality of page groups. For example, when document data of 100 pages is to be printed in eight copies, the total number of pages to be printed is 800. The smallest number of pages is the smallest total number of pages to be printed for which the automatic distributed printing is executed. As a result, by way of example, when the total number of pages to be printed is 300 or more, and 300 has been set as the smallest number of pages, the automatic distributed printing is executed. On the other hand, when the total number of pages to be printed is smaller than 300, and 300 has been set as the smallest number of pages, the automatic distributed printing is not executed.

Meanwhile, there is known a system in which, when the user selects a distributed printing function, a number-of-copies allocation screen is displayed so that the user can set an arbitrary number of copies to be printed to each of a plurality of image forming apparatuses that are used in the distributed printing. However, such a system requires the user to determine whether or not to select the distributed printing each time he/she instructs printing, and thus troublesome for the user. On the other hand, according to the image forming system of the present embodiment, as described above, when the total number of pages to be printed is equal to or greater than the preset smallest number of pages, the distributed printing is automatically executed. As a result, according to the image forming system of the present embodiment, the printing time for printing a lot of pages can be reduced, and the trouble of the user for instructing printing can be reduced.

The print job transmitting portion 153 generates a plurality of divided print jobs that respectively correspond to the plurality of page groups divided by the dividing portion 152, and transmits the plurality of divided print jobs to the plurality of image forming apparatuses 2, respectively (see FIG. 9, FIG. 11). For example, the dividing portion 152 divides the print object into four page groups, and the print job transmitting portion 153 generates four divided print jobs that correspond to the four page groups, and transmits the four divided print jobs to the four image forming apparatuses 2, respectively.

Figures 3, 4:
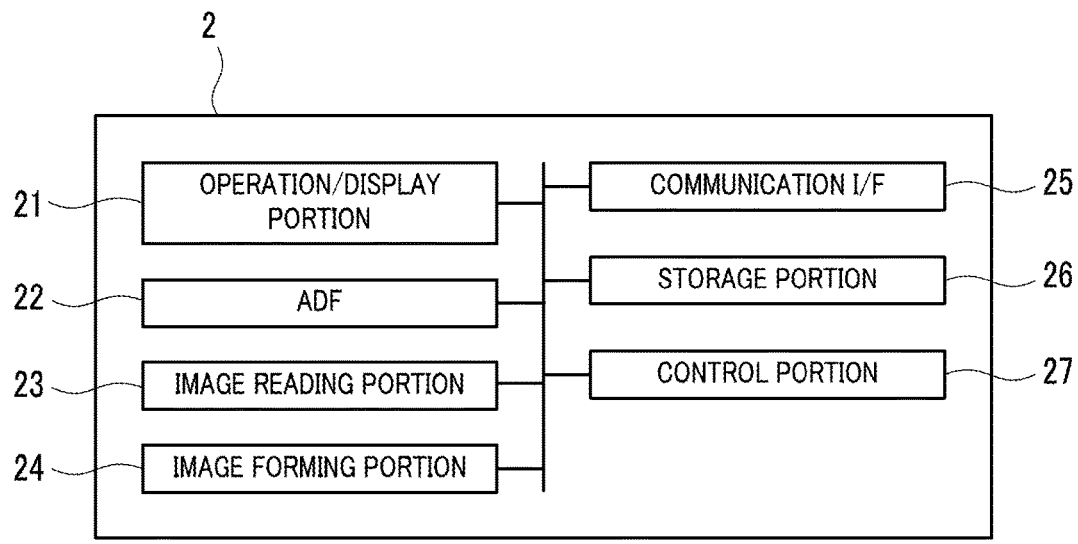
FIG. 3 is a block diagram showing the configuration of an image forming apparatus included in the image forming system according to an embodiment of the present disclosure.
FIG. 4 is a diagram showing an example of an automatic distributed printing setting screen used in the image forming system according to an embodiment of the present disclosure.

The smallest-number-of-pages setting portion 154 performs an initial setting of the smallest number of pages in response to a user operation (see FIG. 4).

The division type selecting portion 155 performs an initial setting of whether the dividing portion 152 should divide the print object in units of copies or in units of pages, in response to a user operation (see FIG. 4).

The apparatus-to-be-used selecting portion 156 performs, in response to a user operation, an initial setting of a plurality of image forming apparatuses to which the divided print jobs are transmitted by the print job transmitting portion 153 (see FIG. 5).

The discharge tray selecting portion 157, when each of the image forming apparatuses 2 includes a plurality of discharge trays, performs, in response to a user operation, an initial setting of a discharge tray selected from the plurality of discharge trays for use in each divided print job (see FIG. 6).

The allocation order setting portion 158 performs, in response to a user operation, an initial setting of an allocation order for the plurality of image forming apparatuses (see FIG. 7). The allocation order is set so that the print object is divided into page groups and the page groups are allocated to a plurality of image forming apparatuses 2 for printing. For example, when four page groups divided from document data of 400 pages are respectively allocated to four image forming apparatuses so as to be printed, the initial page group (for example, a page group of pages 1 to 100) is allocated to the first image forming apparatus 2 in the allocation order. Similarly, the second page group (for example, a page group of pages 101 to 200) is allocated to the second image forming apparatus 2 in the allocation order; the third page group (for example, a page group of pages 201 to 300) is allocated to the third image forming apparatus 2 in the allocation order; and the fourth (last) page group (for example, a page group of pages 301 to 400) is allocated to the fourth image forming apparatus 2 in the allocation order.

As shown in FIG. 3, each of the image forming apparatuses 2 includes an operation/display portion 21, an ADF 22, an image reading portion 23, an image forming portion 24, a communication I/F 25, a storage portion 26, and a control portion 27. Specifically, the image forming apparatuses 2 are multifunction peripherals each having a plurality of functions such as a printer function, a scanner function, a copy function, and a facsimile function. It is noted that each of the image forming apparatuses 2 is not limited to a multifunction peripheral, but may be an arbitrary apparatus having a function for forming an image on a sheet (for example, a printer, a copier, or a facsimile apparatus).

The operation/display portion 21 includes a display portion and an operation portion, wherein the display portion is a liquid crystal display or the like for displaying information, and the operation portion is composed of a touch panel and operation buttons for receiving user operations. The ADF 22 is an automatic document feeder that includes a document sheet setting portion, a conveyance roller, a document sheet pressing, and a sheet discharge portion, and feeds a document sheet so that the document sheet can be read by the image reading portion 23. The image reading portion 23 includes a document sheet table, a light source, a mirror, an optical lens, and a CCD (Charge Coupled Device), and can read an image within a reading range including a document sheet and output the read image as the image data.

The image forming portion 24 can execute a printing process by the electrophotography or the inkjet method to form an image on a sheet based on the image data. When the image forming portion 24 is an electrophotographic image forming portion, the image forming portion 24 includes, for example, a photoconductor drum, a charger, an exposure device, a developing device, a transfer device, and a fixing device.

The communication I/F 25 is a communication interface that can execute a communication process of communicating with an external information processing apparatus such as a facsimile apparatus or a personal computer via a communication network such as a telephone line, the Internet, or a LAN, in accordance with a predetermined communication protocol.

The storage portion 26 is a nonvolatile storage portion such as a hard disk or EEPROM. The storage portion 26 stores image data and various control programs that are executed by the control portion 27.

The control portion 27 includes control equipment such as a CPU, a ROM, and a RAM. The CPU is a processor that executes various calculation processes. The ROM is a nonvolatile storage portion in which various information such as control programs for causing the CPU to execute various processes are stored in advance. The RAM is a volatile or nonvolatile storage portion that is used as a temporary storage memory (working area) for the various processes executed by the CPU Next, the operation of the print host apparatus 1 is explained with reference to FIG. 4 to FIG. 12.

In the print host apparatus 1, the initial setting process for the automatic distributed printing is performed in response to user operation. The control portion 15 of the print host apparatus 1 starts the initial setting process in response to a predetermined operation on the operation portion 11. Specifically, the control portion 15 displays an automatic-distributed-printing setting screen 30 on the display portion 12 as shown in FIG. 4.

On the automatic-distributed-printing setting screen 30, the automatic distributed printing function is validated or invalidated in response to a user operation. In addition, on the automatic-distributed-printing setting screen 30, the smallest number of pages for the automatic distributed printing is set in response to a user operation. Furthermore, on the automatic-distributed-printing setting screen 30, a division type is selected in response to a user operation. There are two options for the division type: "divided in units of copies"; and "divided in units of pages".

When a button 31 is selected on the automatic-distributed-printing setting screen 30, the control portion 15 displays an apparatus-to-be-used selection screen 40 on the display portion 12 as shown in FIG. 5.

The apparatus-to-be-used selection screen 40 displays a list of image forming apparatuses 2 that can communicate with the print host apparatus 1. Specifically, the apparatus-to-be-used selection screen 40 displays identification information and location information of the image forming apparatuses 2 that can communicate with the print host apparatus 1. The identification information includes, for example, the apparatus names, model names, serial numbers, or addresses. The location information includes, for example, the room numbers or floor numbers of the rooms or floors in which the image forming apparatuses 2 are installed. The apparatus-to-be-used selection screen 40 displays check boxes 41 for specifying image forming apparatuses 2 that are used in the automatic distributed printing. On the apparatus-to-be-used selection screen 40, a plurality of image forming apparatuses 2 to be used in the automatic distributed printing are selected in response to user operation, from among the image forming apparatuses 2 that can communicate with the print host apparatus 1. In the example shown in FIG. 5, image forming apparatuses 2A, 2B, 2C and 2F are selected as the plurality of image forming apparatuses 2 to be used in the automatic distributed printing. It is noted that the system may be configured such that only image forming apparatuses 2 of the same model (more generally, image forming apparatuses 2 having the same printing function or the same printing quality) are selected on the apparatus-to-be-used selection screen 40, so that there is no difference in printing result (printing quality) with regard to the image forming apparatuses 2 used in the automatic distributed printing.

The location information may be set arbitrarily in response to a user operation. By referring to the location information, the user can easily recognize the installment locations of the image forming apparatuses 2 that are displayed on the apparatus-to-be-used selection screen 40. With this configuration, by referring to the location information, the user can select, for example, only image forming apparatuses 2 that are located close to the print host apparatus 1.

When a button 42 is selected on the automatic-distributed-printing setting screen 30, the control portion 15 displays a discharge tray selection screen 50 on the display portion 12 as shown in FIG. 6.

The discharge tray selection screen 50 allows the user to select the discharge trays to be used in the automatic distributed printing, from among the discharge trays of the image forming apparatuses 2. When each image forming apparatus 2 has a plurality of discharge trays, it is preferable that a discharge tray different from the one used in the normal print job is selected to be used in the automatic distributed printing. This is because, if the same discharge tray is used in both normal print job and automatic distributed printing, it is troublesome to separate sheets output in the automatic distributed printing based on a print request of a user, from sheets output in the normal printing based on a print request of another user. As a result, if, for example, the first discharge tray is used in the normal print job, it is preferable that a discharge tray different from the first discharge tray is selected as the discharge tray to be used in the automatic distributed printing.

It is noted that a discharge tray used in the normal print job and a discharge tray used in the automatic distributed printing may be set arbitrarily in each of the image forming apparatuses 2 in advance.

When a button 51 is selected on the discharge tray selection screen 50, the control portion 15 displays an allocation order setting screen 60 on the display portion 12 as shown in FIG. 7.

The allocation order setting screen 60 allows the user to set the allocation order for the image forming apparatuses 2. According to the example of FIG. 7, the allocation order has been set such that the image forming apparatus 2C is the first, the image forming apparatus 2F is the second, the image forming apparatus 2B the is third, and the image forming apparatus 2A is the fourth. By setting the allocation order appropriately, when dividing the print object into a plurality of page groups and allocating the page groups to a plurality of image forming apparatuses 2 for printing, the user can efficiently stack the sheets output from the image forming apparatuses 2.

For example, when document data of 400 pages is printed by dividing the document data into a plurality of page groups and allocating the page groups to four image forming apparatuses 2, the initial page group (for example, a page group of pages 1 to 100) is allocated to an image forming apparatus 2 that is the first in the allocation order. Similarly, the second page group (for example, a page group of pages 101 to 200) is allocated to an image forming apparatus 2 that is the second in the allocation order; the third page group (for example, a page group of pages 201 to 300) is allocated to an image forming apparatus 2 that is the third in the allocation order; and the fourth (last) page group (for example, a page group of pages 301 to 400) is allocated to an image forming apparatus 2 that is the fourth in the allocation order. In that case, by collecting the sheets from the image forming apparatuses 2 in the allocation order, it is possible to stack the sheets from the initial page group toward the last page group. In view of this, by setting the allocation order such that the moving distance of the user becomes the shortest when starting with the print host apparatus 1, passing the plurality of image forming apparatuses 2 used in the automatic distributed printing, and returning to the print host apparatus 1, it is possible to stack the sheets output from the image forming apparatuses 2 efficiently in a short time.

When a button 61 is selected on the allocation order setting screen 60, the control portion 15 ends the initial setting process for the automatic distributed printing.

Once the initial setting process is performed, the automatic distributed printing is performed as necessary based on the information set or selected in the initial setting process, each time a print request is input from a user. In the following, the operation of the print host apparatus 1 performed upon input of a print request from a user is described with reference to FIG. 8 to FIG. 12.

The control portion 15 displays a print request screen 70 on the display portion 12 as shown in FIG. 8 in response to a user operation. For example, when the user inputs an instruction for printing document data while application software for displaying or editing the document data is running on the print host apparatus 1, the print request screen 70 as shown in FIG. 8 is displayed on the display portion 12.

The number of pages constituting a copy is displayed on the print request screen 70. In addition, the number of copies to be printed can be set in response to a user operation on the print request screen 70. When a button 71 is selected on the print request screen 70, the control portion 15 executes a print control process based on the initial settings.

It is noted that the system may be configured such that, when a user inputs a print request, the user can arbitrarily change information that has been set or selected in the initial setting process.

According to the example of FIG. 8, the total number of pages to be printed is 800. Since the total number exceeds the smallest number of pages (that has been set to 300 as shown in FIG. 4), the automatic distributed printing is executed. The division type has been set to "divided in units of copies" as shown in FIG. 4. In addition, the image forming apparatuses 2A, 2B, 2C and 2F have been selected as the image forming apparatuses 2 for use in the automatic distributed printing. As a result, the control portion 15 divides the total number of pages to be printed into four page groups in units of copies so that the distributed printing of the print object can be performed by using the image forming apparatuses 2A, 2B, 2C and 2F. For example, the control portion 15 calculates the number of copies that are to be printed by each image forming apparatus 2 such that the image forming apparatuses 2 print as equal number of pages as possible, by dividing the number of copies to be printed by the number of image forming apparatuses 2 that are used in the automatic distributed printing. As a result, in this example, the total number of pages to be printed is divided into four page groups, each including two copies. It is noted that, when the total number of copies to be printed is not divisible by the number of image forming apparatuses 2 used in the automatic distributed printing, the image forming apparatuses 2 do not print an equal number of copies.

The control portion 15 generates divided print jobs 80A, 80B, 80C and 80F to be transmitted to the image forming apparatuses 2A, 2B, 2C and 2F as shown in FIG. 9 by allocating the four page groups determined as described above to the four image forming apparatuses 2A, 2B, 2C and 2F. It is noted that, in the example of FIG. 9, an instruction for printing allocation information 81 (see FIG. 10) is attached to the divided print job 80C. As shown in FIG. 10, the allocation information 81 indicates the page groups allocated to the image forming apparatuses 2.

It is noted that in the present embodiment, an instruction for printing the allocation information 81 is attached to the divided print job 80C that is to be transmitted to the image forming apparatus 2C which is the first in the allocation order. However, in another embodiment, the instruction for printing the allocation information 81 may be attached to all of the divided print jobs 80A, 80B, 80C and 80F.

The control portion 15 transmits the divided print jobs 80A, 80B, 80C and 80F generated as described above to the corresponding image forming apparatuses 2A, 2B, 2C and 2F. Upon receiving the divided print job 80A, the image forming apparatus 2A prints two copies of the document data based on the divided print job 80A, each of the two copies including all pages of the document data (pages 1-100). The image forming apparatus 2B prints two copies of the document data based on the divided print job 80B, each of the two copies including all pages of the document data (pages 1-100). The image forming apparatus 2C prints two copies of the document data based on the divided print job 80C and prints the allocation information 81 as shown in FIG. 10, each of the two copies including all pages of the document data (pages 1-100). The image forming apparatus 2F prints two copies of the document data based on the divided print job 80F, each of the two copies including all pages of the document data (pages 1-100).

When the print process of the image forming apparatuses 2 is completed, first, the user goes to the image forming apparatus 2C that is the first in the allocation order, and collects the sheets from the second discharge tray of the image forming apparatus 2C. The collected sheets include a sheet on which the allocation information 81 is printed as shown in FIG. 10. This makes it possible for the user to collect the sheets from the remaining image forming apparatuses 2F, 2B and 2A efficiently by referring to the allocation information 81 printed on the sheet.

Meanwhile, in a case where the division type is set to "divided in units of pages" on the automatic-distributed-printing setting screen 30 of FIG. 4, the control portion 15 divides the print object into four page groups in units of pages so as to perform the distributed printing of the print object by using the image forming apparatuses 2A, 2B, 2C and 2F. For example, the control portion 15 determines the page ranges to be printed by respective image forming apparatuses 2 used in the automatic distributed printing by dividing the number of pages of a copy of the print object by the number of image forming apparatuses 2 such that the image forming apparatuses 2 print as equal number of pages as possible. Specifically, the control portion 15 divides the print object into a plurality of page groups that are each composed of pages with sequential page numbers. As a result, in this example, the print object is divided into: a page group composed of pages 1 to 25; a page group composed of pages 26 to 50; a page group composed of pages 51 to 75; and a page group composed of pages 76 to 100. It is noted that, when the number of pages of a copy of the print object is not divisible by the number of image forming apparatuses 2 used in the automatic distributed printing, the image forming apparatuses 2 do not print an equal number of pages.

The control portion 15 generates divided print jobs 80A, 80B, 80C and 80F to be transmitted to the image forming apparatuses 2A, 2B, 2C and 2F as shown in FIG. 11 by allocating the four page groups, namely, from the initial page group (composed of pages 1 to 25) to the last page group (composed of pages 76 to 100), to the four image forming apparatuses 2A, 2B, 2C and 2F in the allocation order. It is noted that, in the example of FIG. 11, an instruction for printing allocation information 81, an example of which is shown in FIG. 12, is attached to the divided print job 80C. In the example shown in FIG. 12 of the instruction for printing allocation information 81, identification information of the image forming apparatuses 2 are arranged in the allocation order from top to bottom.

It is noted that in the present embodiment, the instruction for printing the allocation information 81, which indicates the page groups allocated to the image forming apparatuses, is attached to the divided print job 80C that corresponds to the initial page group. However, in another embodiment, the instruction for printing the allocation information 81 may be attached to all of the divided print jobs 80A, 80B, 80C and 80F.

The control portion 15 transmits the divided print jobs 80A, 80B, 80C and 80F generated as described above to the corresponding image forming apparatuses 2A, 2B, 2C and 2F. Upon receiving the divided print job 80A, the image forming apparatus 2A prints eight copies of a page range (pages 76-100) of the document data based on the divided print job 80A. The image forming apparatus 2B prints eight copies of a page range (pages 51-75) of the document data based on the divided print job 80B. The image forming apparatus 2C prints eight copies of a page range (pages 1-25) of the document data, and the allocation information 81 as shown in FIG. 12, based on the divided print job 80C. The image forming apparatus 2F prints eight copies of a page range (pages 26-50) of the document data based on the divided print job 80F.

When the print process of the image forming apparatuses 2 is completed, first, the user goes to the image forming apparatus 2C that is the first in the allocation order, and collects the sheets from the second discharge tray of the image forming apparatus 2C. The collected sheets include a sheet on which the allocation information 81 as shown in FIG. 12 is printed. This makes it possible for the user to collect the sheets from the remaining image forming apparatuses 2F, 2B and 2A efficiently by referring to the allocation information 81 printed on the sheet.

It is noted that, when an error occurs during an execution of a divided print job, the control portion 15 transmits the divided print job of the error to an image forming apparatus 2 to which has been allocated a page group that immediately precedes a page group corresponding to the divided print job. For example, when an error occurs during an execution of the divided print job 80B executed by the image forming apparatus 2B, the control portion 15 transmits the divided print job 80B to the image forming apparatus 2F to which a page group (pages 26-50) that immediately precedes a page group (pages 51-75) corresponding to the divided print job 80B has been allocated. Upon receiving the divided print job 80B, the image forming apparatus 2F executes the divided print job 80B after executing the divided print job 80F. That is, the image forming apparatus 2F prints a page range of pages 26-75. As a result, even if an error occurs during an execution of a divided print job, the user can stack the sheets from the initial page group toward the last page group by collecting the sheets from the image forming apparatuses 2 in the allocation order.

It is noted that the system may be configured such that, when an error occurs during execution of a divided print job, the user is asked to determine whether or not the divided print job should be transmitted to another image forming apparatus 2, without automatically transmitting the divided print job to another image forming apparatus 2 as described above.

Figure 13:
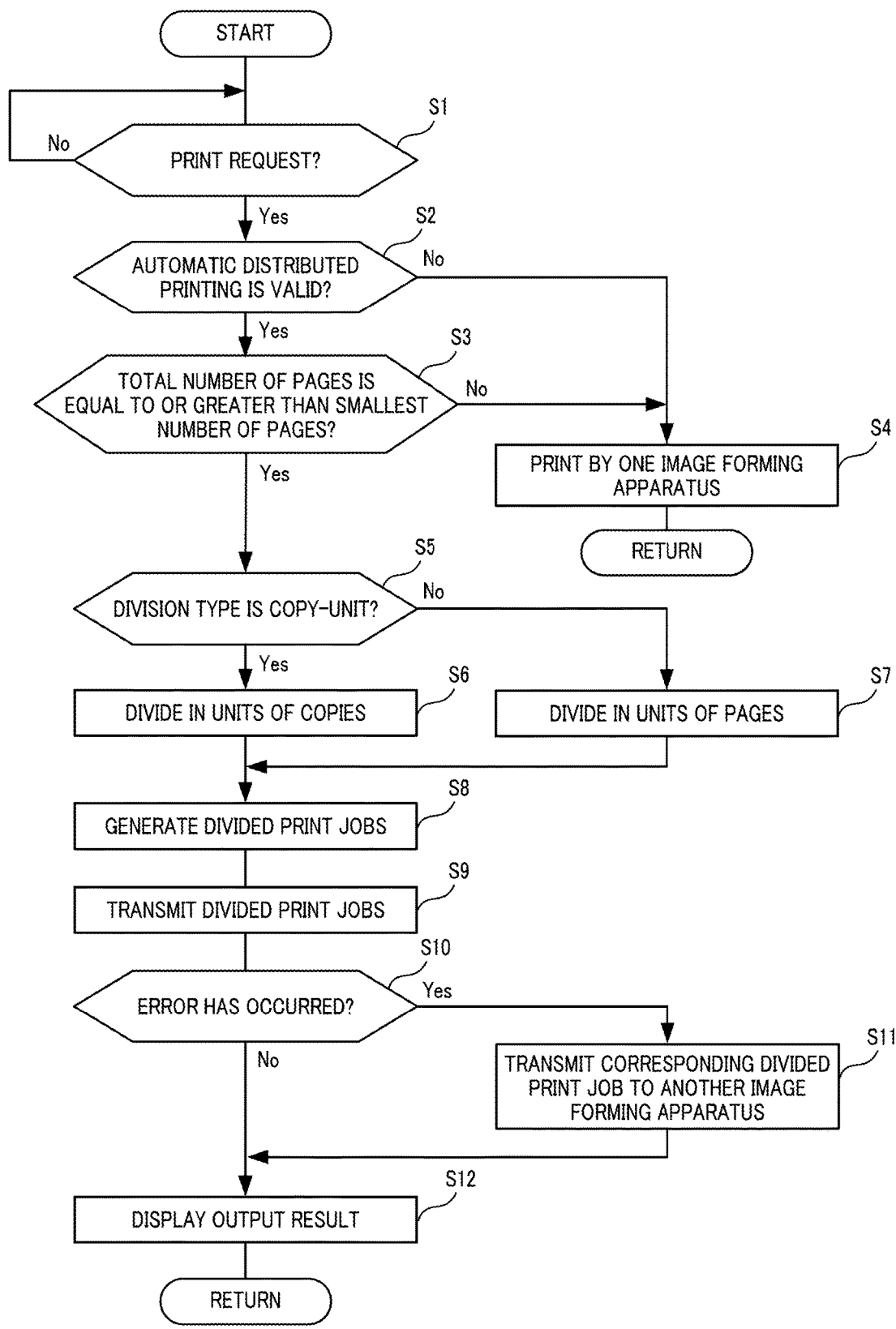
FIG. 13 is a flowchart showing an example of the procedure of a print control process that is executed in the image forming system according to an embodiment of the present disclosure.

The following describes, with reference to FIG. 13, an example of the procedure of the print control process that is executed by the control portion 15 of the print host apparatus 1. Here, steps S1, S2, . . . represent numbers assigned to the processing procedures (steps) executed by the control portion 15. It is noted that the print control process is, for example, started in response to a power-on of the print host apparatus 1, and is ended in response to a power-off of the print host apparatus 1.

<Step S1>

First, in step S1, the control portion 15 determines whether or not a print request has been input by the user via the operation portion 11. For example, when the button 71 is selected on the print request screen 70 shown in FIG. 8, the control portion 15 determines that a print request has been input by the user. When it is determined that a print request has been input by the user (S1: Yes), the process moves to step S2. On the other hand, when it is determined that a print request has not been input by the user (S1: No), the control portion 15 repeats the execution of the process of step S1 until a print request is input by the user.

<Step S2>

In step S2, the control portion 15 determines whether or not the automatic distributed printing function is valid. For example, the control portion 15 determines that the automatic distributed printing function is valid when the automatic distributed printing function has been validated in response to a user operation on the automatic-distributed-printing setting screen 30 shown in FIG. 4. When it is determined that the automatic distributed printing function is valid (S2: Yes), the process moves to step S3. On the other hand, when it is determined that the automatic distributed printing function is not valid (S2: No), the process moves to step S4.

<Step S3>

In step S3, the control portion 15 determines whether or not the total number of pages to be printed is equal to or greater than a preset smallest number of pages. For example, the control portion 15 calculates the total number of pages to be printed based on the number of copies to be printed that has been set in response to a user operation on the print request screen 70 shown in FIG. 8. The control portion 15 then compares the calculated total number of pages to be printed to the smallest number of pages that has been set in response to a user operation on the automatic-distributed-printing setting screen 30 shown in FIG. 4. When it is determined that the total number of pages to be printed is equal to or greater than the smallest number of pages (S3: Yes), the process moves to step S5. On the other hand, when it is determined that the total number of pages to be printed is smaller than the smallest number of pages (S3: No), the process moves to step S4.

<Step S4>

In step S4, the control portion 15 generates a print job that corresponds to the print request, and transmits the print job to one of the image forming apparatuses 2 (for example, an image forming apparatus 2 specified by the user). This allows the printing process corresponding to the print request to be executed by an image forming apparatus 2. The process then returns to step S1.

<Step S5>

In step S5, the control portion 15 determines whether or not the division type is copy-unit. For example, when the division type that has been selected in response to a user operation on the automatic-distributed-printing setting screen 30 shown in FIG. 4 is "divided in units of copies", the control portion 15 determines that the division type is copy-unit, and when the division type that has been selected in response to a user operation on the automatic-distributed-printing setting screen 30 shown in FIG. 4 is "divided in units of pages", the control portion 15 determines that the division type is page-unit. When it is determined that the division type is copy-unit (S5: Yes), the process moves to step S6. On the other hand, when it is determined that the division type is not copy-unit, namely, the division type is page-unit (S5: No), the process moves to step S7.

<Step S6>

In step S6, the control portion 15 divides the print object in units of copies. For example, the control portion 15 divides the number of copies to be printed that has been set in response to a user operation on the print request screen 70 shown in FIG. 8, by the number of image forming apparatuses 2 that have been selected in response to a user operation on the apparatus-to-be-used selection screen 40 shown in FIG. 5, and divides the print object in units of copies based on the result of the calculation. As a result, the print object is divided into a plurality of page groups.

<Step S7>

In step S7, the control portion 15 divides the print object in units of pages. For example, the control portion 15 divides the number of pages of a copy of the print object by the number of image forming apparatuses 2 that have been selected in response to a user operation on the apparatus-to-be-used selection screen 40 shown in FIG. 5, and divides the print object in units of pages based on the result of the calculation. As a result, the print object is divided into a plurality of page groups.

<Step S8>

In step S8, the control portion 15 generates divided print jobs that are to be transmitted to the image forming apparatuses 2. For example, the control portion 15 generates divided print jobs that are to be transmitted to the image forming apparatuses 2, by allocating the plurality of page groups to the image forming apparatuses 2 in the allocation order that has been set in response to a user operation on the allocation order setting screen 60 shown in FIG. 7. In addition, the control portion 15 attaches the instruction for printing the allocation information 81 that is shown in FIG. 10 or FIG. 12, to a divided print job that corresponds to an image forming apparatus 2 that is the first in the allocation order.

<Step S9>

In step S9, the control portion 15 transmits the plurality of divided print jobs to the corresponding image forming apparatuses 2.

<Step S10>

In step S10, the control portion 15 determines whether or not an error has occurred during an execution of a divided print job in any of the image forming apparatuses 2 to which the divided print jobs were transmitted. For example, when an error notification signal is received from any the image forming apparatuses 2, the control portion 15 determines that an error has occurred during an execution of a divided print job in the image forming apparatus 2. When it is determined that an error has occurred in any of the image forming apparatuses 2 (S10: Yes), the process moves to step S11. On the other hand, when it is determined that an error has not occurred in any of the image forming apparatuses 2 (S10: No), the process moves to step S12

<Step S11>

In step S11, the control portion 15 transmits a divided print job corresponding to a page group allocated to the image forming apparatus 2 in which the error has occurred, to another image forming apparatus 2. For example, the control portion 15 transmits a divided print job corresponding to a page group allocated to the image forming apparatus 2 in which the error has occurred, to another image forming apparatus 2 which precedes, by one in the allocation order, the image forming apparatus 2 in which the error has occurred. It is noted that when there is no image forming apparatus 2 which precedes, by one in the allocation order, the image forming apparatus 2 in which the error has occurred, the control portion 15 may transmit the divided print job to another image forming apparatus 2 which succeeds, by one in the allocation order, the image forming apparatus 2 in which the error has occurred.

\<Step S12\>

In step S12, the control portion 15 displays, on the display portion 12, output results of the image forming apparatuses 2. For example, the control portion 15 receives output result notification signals from the image forming apparatuses 2, and displays an output result screen 90 on the display portion 12 as shown in FIG. 14. From the output result screen 90 shown in FIG. 14, the user can recognize that an error has occurred in the image forming apparatus 2B, and that pages 51-75 originally allocated to the image forming apparatus 2B have been printed normally by the image forming apparatus 2F. Subsequently, the process returns to step S1.

It is noted that the process of step S1 (the print request receiving step) described above is executed by the print request receiving portion 151 of the control portion 15. The processes of steps S3 to S7 (the dividing step) described above are executed by the dividing portion 152 of the control portion 15. The processes of steps S8 to S9 (the print job transmission step) described above are executed by the print job transmitting portion 153 of the control portion 15.

As described above, according to the present embodiment, it is possible to reduce the printing time when a lot of pages are printed, and reduce the trouble of the user in instructing a print process.

It is noted that although the initial setting process and the print control process are executed by the print host apparatus 1 according to the present embodiment, the present disclosure is not limited to the configuration. For example, a part or all of the initial setting process may be executed by the image forming apparatus 2. Similarly, a part or all of the print control process may be executed by the image forming apparatus 2.

In addition, the present embodiment explains a case where document data is printed. However, the present disclosure is not limited to the configuration. For example, the present disclosure is applicable to a case where document sheets are read by the image reading portion 23 and the read document sheets are copied. Furthermore, the present disclosure is applicable to a case where images received via facsimile are printed.

In addition, according to the present embodiment, the division type is set as an initial setting in response to a user operation. However, the present disclosure is not limited to the configuration. For example, the division type may be automatically determined in accordance with the number of copies to be printed and the number of pages of a copy of the print object. By way of example, the system may be configured such that the distributed printing is automatically performed in units of pages when the number of copies to be printed is small (for example, when the number of copies to be printed is one). Similarly, the system may be configured such that the distributed printing is automatically performed in units of copies when a copy of the print object is composed of a small number of pages (for example, when a copy of the print object is composed of one page).

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming system comprising:
    a plurality of image forming apparatuses;
    a print request receiving portion, executed on a processor, configured to receive a print request for a print object;
    a dividing portion, executed on the processor and configured to, when a total number of pages to be printed is equal to or greater than a preset smallest number of pages, divide the print object into a plurality of page groups;
    a print job transmitting portion, executed on the processor, configured to generate a plurality of divided print jobs that respectively correspond to the plurality of page groups divided by the dividing portion, and transmit the plurality of divided print jobs to the plurality of image forming apparatuses, respectively;
    an allocation order setting portion, executed on the processor and configured to perform, in response to a user operation, an initial setting of an allocation order in which the plurality of image forming apparatuses are allocated; and
    a controller configured to display an output result screen on a display based on output result notification signals from the image forming apparatuses, the output result screen indicating which image forming apparatus among the plurality of image forming apparatuses has printed each page of the print object, wherein
    the dividing portion divides the print object into a plurality of page groups that are each composed of one or more pages with sequential page numbers,
    the print job transmitting portion allocates the plurality of page groups, from an initial page group to a last page group, to the plurality of image forming apparatuses in the allocation order,
    the print job transmitting portion attaches an instruction for printing allocation information to only a divided print job that is to be transmitted to an image forming apparatus that is the first in the allocation order and corresponds to the initial page group, the allocation information indicating page groups allocated to the plurality of image forming apparatuses, and
    when an error occurs during an execution of a divided print job, the print job transmitting portion transmits the divided print job to an image forming apparatus that precedes, by one in the allocation order, an image forming apparatus in which the error has occurred and to which a page group that immediately precedes a page group corresponding to the divided print job has been allocated.

2. The image forming system according to claim 1 further comprising:
    a smallest-number-of-pages setting portion, executed on the processor, configured to perform an initial setting of the smallest number of pages in response to a user operation.

3. The image forming system according to claim 1 further comprising:
    a division type selecting portion, executed on the processor, configured to perform an initial setting of whether the dividing portion should divide the print object in units of copies or in units of pages, in response to a user operation.

4. The image forming system according to claim 1, wherein
    the dividing portion divides the print object into the plurality of page groups based on a result of dividing the number of copies to be printed, or the number of pages of a copy, by the number of the plurality of image forming apparatuses.

5. The image forming system according to claim 1 further comprising:

an apparatus-to-be-used selecting portion, executed on the processor and configured to perform, in response to a user operation, an initial setting of the plurality of image forming apparatuses to which the divided print jobs are to be transmitted by the print job transmitting portion.

6. The image forming system according to claim 5, wherein
when the apparatus-to-be-used selecting portion performs the initial setting of the plurality of image forming apparatuses in response to a user operation, the apparatus-to-be-used selecting portion presents, to the user, location information of each of the plurality of image forming apparatuses.

7. The image forming system according to claim 1, wherein
each of the plurality of image forming apparatuses includes a plurality of discharge trays, and
the image forming system further comprises:
a discharge tray selecting portion, executed on a processor and configured to perform, in response to a user operation, an initial setting of a discharge tray selected from the plurality of discharge trays for use in a divided print job corresponding to each of the plurality of image forming apparatuses.

8. The image forming system according to claim 1, wherein
the print job transmitting portion attaches an instruction for printing allocation information to at least one of the plurality of divided print jobs, the allocation information indicating page groups allocated to the plurality of image forming apparatuses.

9. The image forming system according to claim 1, wherein when the error occurs during the execution of the divided print job, in a case where there is no image forming apparatus that precedes, by one in the allocation order, the image forming apparatus in which the error has occurred, the print job transmitting portion transmits the divided print job to another image forming apparatus which succeeds, by one in the allocation order, the image forming apparatus in which the error has occurred.

10. An image forming method comprising:
a print request receiving step of receiving a print request for a print object;
a dividing step of, when a total number of pages to be printed is equal to or greater than a preset smallest number of pages, dividing the print object into a plurality of page groups;
a print job transmitting step of generating a plurality of divided print jobs that respectively correspond to the plurality of page groups divided in the dividing step, and transmit the plurality of divided print jobs to the plurality of image forming apparatuses, respectively;
a step of performing, in response to a user operation, an initial setting of an allocation order in which the plurality of image forming apparatuses are allocated; and
a step of displaying an output result screen on a display based on output result notification signals from the image forming apparatuses, the output result screen indicating which image forming apparatus among the plurality of image forming apparatuses has printed each page of the print object, wherein
the dividing step divides the print object into a plurality of page groups that are each composed of one or more pages with sequential page numbers,
the print job transmitting step allocates the plurality of page groups, from an initial page group to a last page group, to the plurality of image forming apparatuses in the allocation order,
the print job transmitting step attaches an instruction for printing allocation information to only a divided print job that is to be transmitted to an image forming apparatus that is the first in the allocation order and corresponds to the initial page group, the allocation information indicating page groups allocated to the plurality of image forming apparatuses, and
when an error occurs during an execution of a divided print job, the print job transmitting step transmits the divided print job to an image forming apparatus that precedes, by one in the allocation order, an image forming apparatus in which the error has occurred and to which a page group that immediately precedes a page group corresponding to the divided print job has been allocated.

11. The image forming method according to claim 10, wherein when the error occurs during the execution of the divided print job, in a case where there is no image forming apparatus that precedes, by one in the allocation order, the image forming apparatus in which the error has occurred, the print job transmitting step transmits the divided print job to another image forming apparatus which succeeds, by one in the allocation order, the image forming apparatus in which the error has occurred.

12. An information processing apparatus comprising:
a communication interface configured to perform communications with a plurality of image forming apparatuses;
a print request receiving portion, executed on a processor, configured to receive a print request for a print object;
a dividing portion, executed on a processor and configured to, when a total number of pages to be printed is equal to or greater than a preset smallest number of pages, divide the print object into a plurality of page groups;
a print job transmitting portion, executed on a processor, configured to generate a plurality of divided print jobs that respectively correspond to the plurality of page groups divided by the dividing portion, and transmit the plurality of divided print jobs to the plurality of image forming apparatuses, respectively;
an allocation order setting portion, executed on the processor and configured to perform, in response to a user operation, an initial setting of an allocation order in which the plurality of image forming apparatuses are allocated; and
a controller configured to display an output result screen on a display based on output result notification signals from the image forming apparatuses, the output result screen indicating which image forming apparatus among the plurality of image forming apparatuses has printed each page of the print object, wherein
the dividing portion divides the print object into a plurality of page groups that are each composed of one or more pages with sequential page numbers,
the print job transmitting portion allocates the plurality of page groups, from an initial page group to a last page group, to the plurality of image forming apparatuses in the allocation order,
the print job transmitting portion attaches an instruction for printing allocation information to only a divided print job that is to be transmitted to an image forming apparatus that is the first in the allocation order and corresponds to the initial page group, the allocation information indicating page groups allocated to the plurality of image forming apparatuses, and when an error occurs during an execution of a divided print job, the print job transmitting portion transmits the divided print job to an image forming apparatus that precedes, by one in the allocation order, an image forming apparatus in which the error has occurred and to which a page group that immediately precedes a page group corresponding to the divided print job has been allocated.

13. The information processing apparatus according to claim 12, wherein when the error occurs during the execution of the divided print job, in a case where there is no image forming apparatus that precedes, by one in the allocation order, the image forming apparatus in which the error has occurred, the print job transmitting portion transmits the divided print job to another image forming apparatus which succeeds, by one in the allocation order, the image forming apparatus in which the error has occurred.

* * * * *